(12) United States Patent
Yoshihara et al.

(10) Patent No.: US 9,031,767 B2
(45) Date of Patent: May 12, 2015

(54) INTERNAL COMBUSTION ENGINE CONTROL DEVICE

(75) Inventors: Masatomo Yoshihara, Toyota (JP); Shoichi Kuwayama, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/351,231

(22) PCT Filed: Oct. 12, 2011

(86) PCT No.: PCT/JP2011/073444
§ 371 (c)(1),
(2), (4) Date: Apr. 11, 2014

(87) PCT Pub. No.: WO2013/054407
PCT Pub. Date: Apr. 18, 2013

(65) Prior Publication Data
US 2014/0244140 A1    Aug. 28, 2014

(51) Int. Cl.
| | |
|---|---|
| *F01M 1/02* | (2006.01) |
| *F02N 11/08* | (2006.01) |
| *F02D 37/00* | (2006.01) |
| *F01M 1/16* | (2006.01) |
| *F02D 29/02* | (2006.01) |

(52) U.S. Cl.
CPC ........... *F02D 37/00* (2013.01); *F01M 1/16* (2013.01); *F02D 29/02* (2013.01); *Y02T 10/48* (2013.01); *F02N 11/0814* (2013.01)

(58) Field of Classification Search
CPC  F02N 11/084; F02N 2011/0881; F01M 1/02; F01M 1/16; F01M 1/20
USPC ...... 701/112; 123/179.4, 196 R, 196 S, 198 C
See application file for complete search history.

(56) References Cited

U.S. PATENT DOCUMENTS

| | | | | |
|---|---|---|---|---|
| 6,170,452 | B1 * | 1/2001 | Wisinski | 123/179.4 |
| 8,355,859 | B2 * | 1/2013 | Maki et al. | 701/113 |
| 8,380,405 | B2 * | 2/2013 | Matsuda et al. | 701/54 |
| 8,739,751 | B2 * | 6/2014 | Stoffels et al. | 123/179.4 |
| 2002/0093202 | A1 * | 7/2002 | Downs et al. | 290/40 R |
| 2013/0311061 | A1 * | 11/2013 | Ando | 701/102 |

FOREIGN PATENT DOCUMENTS

| | | |
|---|---|---|
| JP | 2010-048159 A | 3/2010 |
| JP | 2010-048194 A | 3/2010 |

(Continued)

*Primary Examiner* — Erick Solis
(74) *Attorney, Agent, or Firm* — Kenyon & Kenyon LLP

(57) ABSTRACT

An electronic control device is applied to an internal combustion engine including an engine driving pump, circulates lubricant by use of a driving force of the internal combustion engine, and reduces that driving load of the pump which works on the internal combustion engine, by executing a low-pressure control to limit a circulation amount of the lubricant when demand for the lubricant is small. Further, when a predetermined automatic stop condition is established, an engine operation is stopped automatically, and when a predetermined restart condition is established during the automatic stop, the internal combustion engine is restarted. Further, the execution of the low-pressure control is prohibited at the time of starting the internal combustion engine along with an operation of an ignition switch, but the execution of the low-pressure control is allowed at the time of restarting the internal combustion engine.

3 Claims, 4 Drawing Sheets

(56) References Cited

FOREIGN PATENT DOCUMENTS

| | | |
|---|---|---|
| JP | 2010-116890 A | 5/2010 |
| JP | 2010-138831 A | 6/2010 |
| JP | 2010-150987 A | 7/2010 |
| JP | 2011-179406 A | 9/2011 |
| WO | 2010/020852 A1 | 2/2010 |

* cited by examiner

INTERNAL COMBUSTION ENGINE CONTROL DEVICE

CROSS-REFERENCE TO RELATED APPLICATIONS

This is a national phase application based on the PCT International Patent Application No. PCT/JP2011/073444 filed on Oct. 12, 2011, the entire contents of which are incorporated herein by reference.

TECHNICAL FIELD

The present invention relates to an internal combustion engine control device which is applied to an internal combustion engine including an engine driving pump, which circulates lubricant by use of a driving force of an internal combustion engine, and which executes a low-pressure control to limit a circulation amount of the lubricant when demand for the lubricant is small, so as to reduce that driving load of the pump which acts on the internal combustion engine.

BACKGROUND ART

Conventionally, an internal combustion engine includes an engine driving pump, and is configured to circulate lubricant to each part of the internal combustion engine by driving the pump.

Further, for example, Patent Document 1 describes a configuration in which a supply passage of lubricant is provided with a pressure relief valve that is able to change a relief pressure, and when demand for the lubricant is small, the relief pressure of the pressure relief valve is decreased so as to execute a low-pressure control to limit a circulation amount of the lubricant. According to such a configuration, it is possible to reduce that driving load of the pump which acts on the internal combustion engine by executing the low-pressure control, thereby eventually restraining fuel consumption of the internal combustion engine.

In the meantime, at the time of starting the internal combustion engine, such a situation occurs that the lubricant in the supply passage flows out during stop of the engine before the starting and the lubricant is not left in the supply passage. In view of this, such a technique has been proposed that at the time of starting the internal combustion engine, the execution of the low-pressure control is prohibited, so that a pressure of the lubricant in the supply passage is brought to a high state right after the engine starting, thereby allowing the lubricant to go around to ends of the supply passage immediately.

Further, conventionally, such a technique has been known that, when a predetermined automatic stop condition, such as a condition in which a vehicle speed is a predetermined speed or less and an accelerator pedal is not stepped on, is established during an engine operation, a control to stop the engine operation automatically, that is, a so-called idle reduction control is executed so as to restrain fuel consumption of the internal combustion engine. Note that, during the automatic stop, when a predetermined restart condition, such a condition in which the accelerator pedal is stepped on again, is established, the internal combustion engine is restarted.

CITATION LIST

Patent Documents

Patent Document 1: Japanese Patent Application Publication No. 2010-116890 (JP 2010-116890 A)

SUMMARY OF THE INVENTION

Problem to be Solved by the Invention

In the meantime, in a case where the above technique to prohibit the execution of the low-pressure control at the time of starting the internal combustion engine is applied to the control device that executes automatic-stop and restart controls on the internal combustion engine, the restart of the internal combustion engine is preformed more frequently, so that the execution of the low-pressure control is prohibited frequently. This results in that execution chance of the low-pressure control is limited greatly, and therefore, there is still room for improvement to restrain fuel consumption of the internal combustion engine.

The present invention is achieved in view of such circumstances, and an object thereof is to provide an internal combustion engine control device that is able to restrain occurrence of insufficiency of supplies of lubricant in engine starting and to reduce that driving load of a pump which acts on an internal combustion engine.

Means for Solving the Problem

The following describes means for solving the problem and effects thereof.

In order to achieve the above object, an internal combustion engine control device according to the present invention is an internal combustion engine control device serving as a control device which is applied to an internal combustion engine including an engine driving pump, which circulates lubricant by use of a driving force of the internal combustion engine, and which reduces that driving load of the pump which acts on the internal combustion engine, by executing a low-pressure control to limit a circulation amount of the lubricant when demand for the lubricant is small, and the internal combustion engine control device limits the execution of the low-pressure control in engine starting. In the internal combustion engine control device, when a predetermined automatic stop condition is established, an engine operation is stopped automatically, and when a predetermined restart condition is established during the automatic stop, the internal combustion engine is restarted, and at the time of restarting the internal combustion engine, the limitation on the execution of the low-pressure control is relaxed.

According to the above aspect, at the time of restarting the internal combustion engine after the automatic stop, the limitation on the execution of the low-pressure control is relaxed, so that a circulation amount of the lubricant is limited right after the restart in comparison with other starting. Here, in the restart of the internal combustion engine, an elapsed time after an engine operation is stopped just before that is often long. In this case, the engine starting is performed before the lubricant in a supply passage flows out in the engine stop. Thus, according to the present invention, a pressure of the lubricant in the supply passage is maintained to be high to some extent right after the engine starting, while the circulation amount of the lubricant is limited.

In view of this, according to the invention according to claim 1, it is possible to restrain occurrence of insufficiency of supplies of the lubricant in the engine starting, and further to reduce that driving load of the pump which acts on the internal combustion engine.

In this case, such an aspect is preferable that when a preceding automatic stop duration time is a predetermined time or more in the restart of the internal combustion engine, the relaxation of the limitation on the execution of the low-pressure control is invalidated and the execution of the low-pressure control is limited.

Even in the restart after the automatic stop of the internal combustion engine, an elapsed time after the engine operation is stopped just before that may be long. In this case, such a situation occurs that the lubricant in the supply passage flows out during the engine stop and almost none of the lubricant is left in the supply passage at the time of the engine starting. Therefore, if the low-pressure control is performed in response to the restart of the internal combustion engine even in such a case, it takes much time for the lubricant to go around to the ends of the supply passage just after the engine starting. In this regard, according to the above aspect, even in the restart of the internal combustion engine, when its preceding automatic stop duration time is a predetermined time or more, the relaxation of the limitation on the execution of the low-pressure control is invalidated and the execution of the low-pressure control is limited. This makes it possible to appropriately restrain occurrence of such a problem that, due to a long preceding automatic stop duration time, the lubricant cannot go around to the ends of the supply passage immediately just after the engine starting.

Further, in this case, such an aspect is preferable that, in the restart of the internal combustion engine, the predetermined time is set to become shorter as an engine temperature during the preceding automatic stop is higher.

In order to reduce that driving load of the pump which acts on the internal combustion engine by increasing execution chance of the low-pressure control, it is preferable that the predetermined time be set as long as possible. However, even if the preceding automatic stop duration time is the same, an amount of the lubricant flowing out of the supply passage during the engine stop increases as a viscosity of the lubricant is lower. Because of this, if the predetermined time is set to a fixed value that is as long as possible on the presumption that the viscosity is high and the lubricant in the supply passage is hard to flow out, the following problem might occur. That is, even in a case where the preceding automatic stop duration time is less than the predetermined time, if the viscosity is low and the lubricant in the supply passage is easy to flow out, such a situation might occur that the lubricant in the supply passage flows out during the engine stop and the lubricant is not left in the supply passage in the engine starting.

In this regard, according to the above aspect, in the restart of the internal combustion engine, the predetermined time is set to become shorter as the engine temperature during the preceding automatic stop is higher. This makes it possible to precisely set the predetermined time according to the engine temperature that has a high correlation with the viscosity of the lubricant. Accordingly, it is possible to precisely restrain occurrence of insufficiency of supplies of the lubricant in the engine starting, and to precisely restrain fuel consumption of the internal combustion engine by reducing that driving load of the pump which acts on the internal combustion engine.

Further, such an aspect is preferable that a supply passage of the lubricant is provided with a pressure relief valve that is able to change the relief pressure, and in the low-pressure control, the relief pressure of the pressure relief valve is decreased so as to limit the circulation amount of the lubricant.

As a configuration to reduce the driving load of the pump by limiting the circulation amount of the lubricant, it is possible to employ the configuration in which the supply passage of the lubricant is provided with the pressure relief valve that is able to change the relief pressure, as described in the above aspect. If such a configuration is employed, it is possible to execute the low-pressure control by decreasing the relief pressure of the pressure relief valve.

MODES FOR CARRYING OUT THE INVENTION

Figure 1:
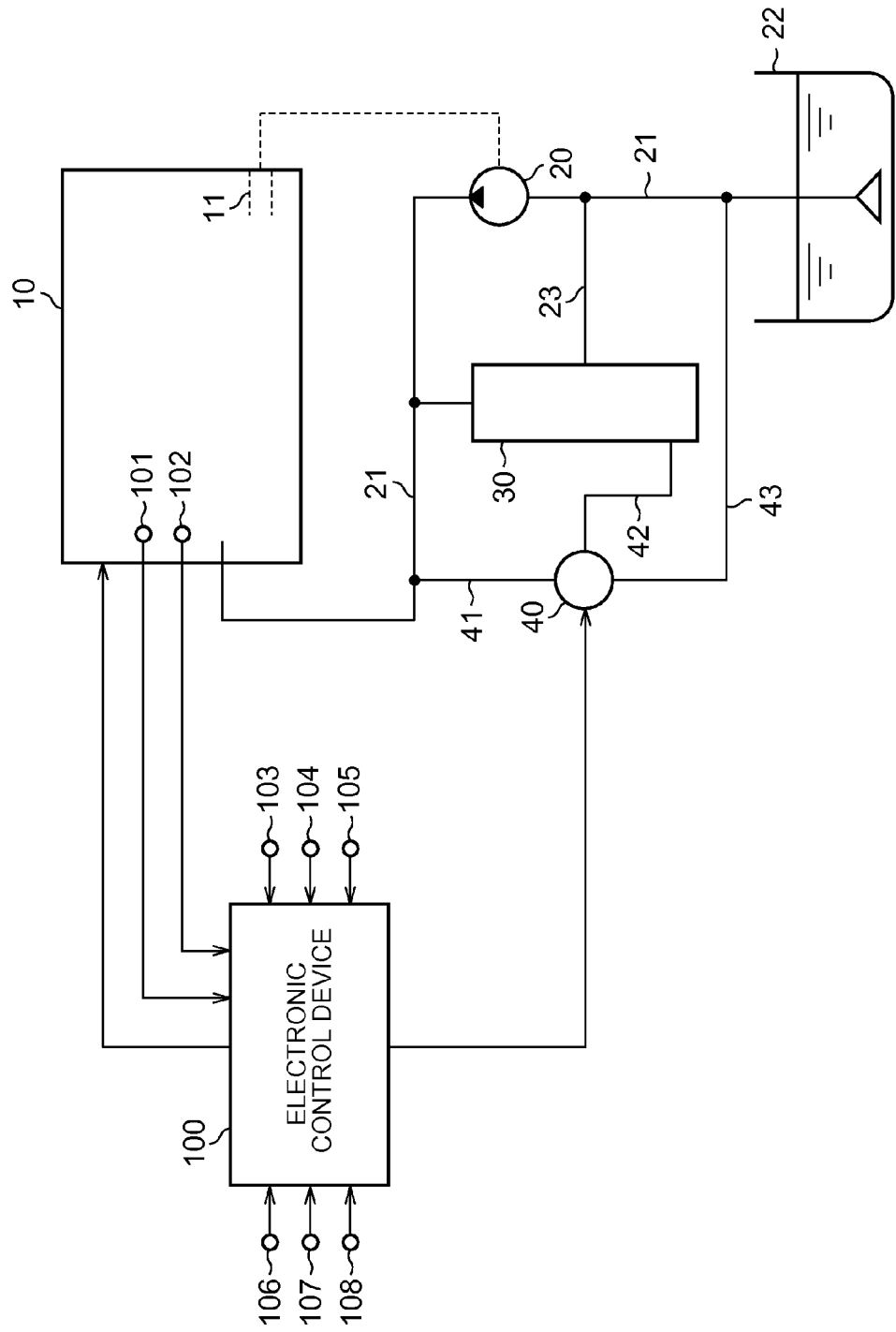
FIG. 1 is a schematic view illustrating a schematic configuration of a hydraulic supply system of an internal combustion engine of an internal combustion engine control device according to one embodiment of the present invention.

With reference to FIGS. 1 to 5, the following describes one embodiment in which an internal combustion engine control device according to the present invention is realized as an electronic control device that generally controls an internal combustion engine to be provided in a vehicle. FIG. 1 illustrates a schematic configuration of a hydraulic supply system of an internal combustion engine according to the present embodiment.

The hydraulic supply system in the present embodiment includes an engine driving pump 20 connected to an output shaft 11 (shown by a broken line in FIG. 1) of an internal combustion engine 10. The hydraulic supply system drives the pump 20 by use of a driving force of the internal combustion engine 10 and pumps, by the pump 20, lubricant accumulated in an oil pan 22, thereby supplying the lubricant to each part of the internal combustion engine 10 which part is a lubricated portion.

As illustrated in FIG. 1, a supply passage 21 is connected to the pump 20, so that the lubricant accumulated in the oil pan 22 is supplied to the lubricated portions via the supply passage 21. Note that the lubricant supplied to the lubricated portions of the internal combustion engine 10 so as to lubricate them drops along an inner portion of the internal combustion engine 10 so as to be accumulated again in the oil pan 22 attached to a bottom portion of the internal combustion engine 10. A pressure relief valve 30 is provided in that part of the supply passage 21 which is more on a downstream side than the pump 20, as illustrated in FIG. 1. A recirculation passage 23 connected to that part of the supply passage 21 which is more on an upstream side than the pump 20 is connected to the pressure relief valve 30. Note that a direction from the oil pan 22 to the pump 20 is assumed a flowing direction of the lubricant flowing through the supply passage 21, and a part of the supply passage 21 between the pump 20 and the oil pan 22 is that part of the supply passage 21 which is more on the upstream side than the pump 20.

Hereby, when a pressure of the lubricant in the supply passage 21 becomes a relief pressure or more, the pressure relief valve 30 is opened, so that part of the lubricant in the supply passage 21 is recirculated via the recirculation passage 23 to that part of the supply passage 21 which is more on the upstream side than the pump 20.

As will be described later, the pressure relief valve 30 is configured such that the relief pressure is changeable in two stages by controlling an oil-pressure switching valve 40. Note that the oil-pressure switching valve 40 is driven based on a driving instruction from the electronic control device 100 that generally controls the internal combustion engine 10.

The electronic control device 100 includes a central processing unit (CPU) that executes a computing process for the control of the internal combustion engine 10, a computing process for the pressure control of the lubricant via the control of the oil-pressure switching valve 40, and the like process. Further, the electronic control device 100 includes a read only memory (ROM) in which to store computing programs and computing maps for the computing processes and various data, a random access memory (RAM) in which to temporarily store results of the computing, and the like.

A crank angle sensor 101 that detects an engine rotation speed NE based on a rotation angle of the output shaft 11, and a water temperature sensor 102 that detects a water temperature (hereinafter referred to as a cooling water temperature ThW) of engine cooling water circulating through a water jacket formed inside the internal combustion engine 10 are connected to the electronic control device 100. Further, a vehicle speed sensor 103 that detects a vehicle speed V, an air flow meter 104 that detects a suction air amount GA introduced into the internal combustion engine 10, and an accelerator position sensor 105 that detects an operation amount of the accelerator pedal by a driver are also connected to the electronic control device 100. Furthermore, a brake sensor 106 that detects a stepping state of a brake by the driver, a shift position sensor 107 that detects an operation position of a shift lever, and an ignition switch 108 that detects an operation position of an ignition key, and the like are also connected to the electronic control device 100.

The electronic control device 100 takes therein signals output from these various sensors 101 to 108, and executes various computing processes for an injection quantity Q, a control of ignition timing, and the like based on the signals thus taken therein. Further, in order to control a circulation amount of the lubricant, the electronic control device 100 operates the oil-pressure switching valve 40 so as to control a pressure and a circulation amount of the lubricant to be supplied to the internal combustion engine 10 via the supply passage 21.

Further, the electronic control device 100 automatically stops the engine operation by stopping fuel injection, when a predetermined automatic stop condition is established. In the present embodiment, the predetermined automatic stop condition is established, when the vehicle speed V is a predetermined speed or less, the operation amount of the accelerator pedal is "0," and the brake is stepped on, for example. Further, when a predetermined restart condition is established during the automatic stop, the internal combustion engine 10 is restarted by driving a starter motor and starting fuel injection and ignition of fuel-air mixture. In the present embodiment, when the stepping on the brake is released or the operation amount of the accelerator pedal increases, for example, the predetermined restart condition is established.

Figure 2:
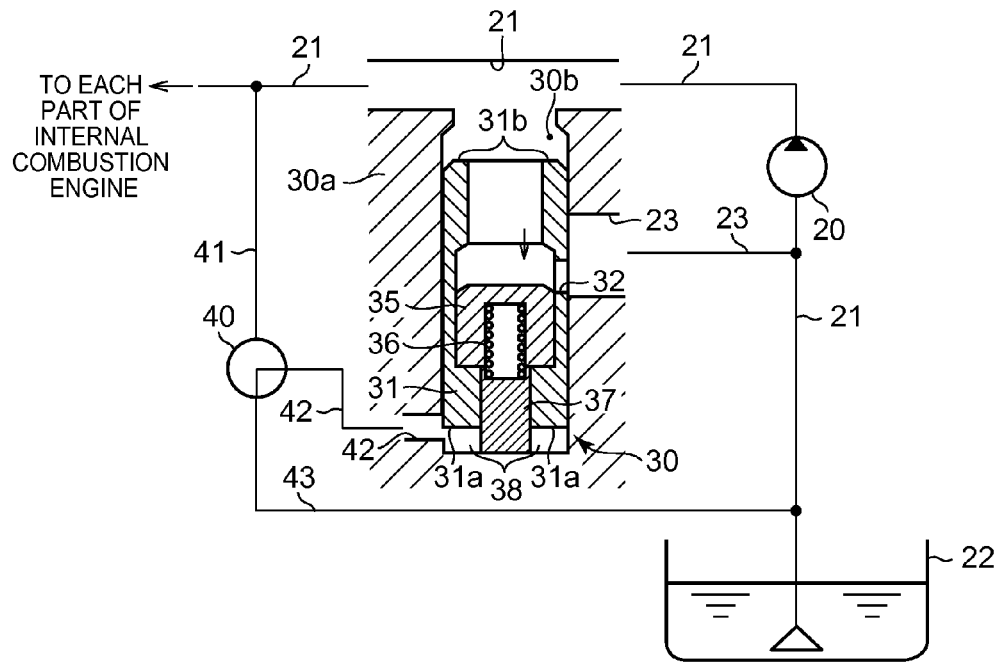
FIG. 2 is a schematic view to describe an operation form in a high relief pressure state of the hydraulic supply system in the embodiment.
Figure 3:
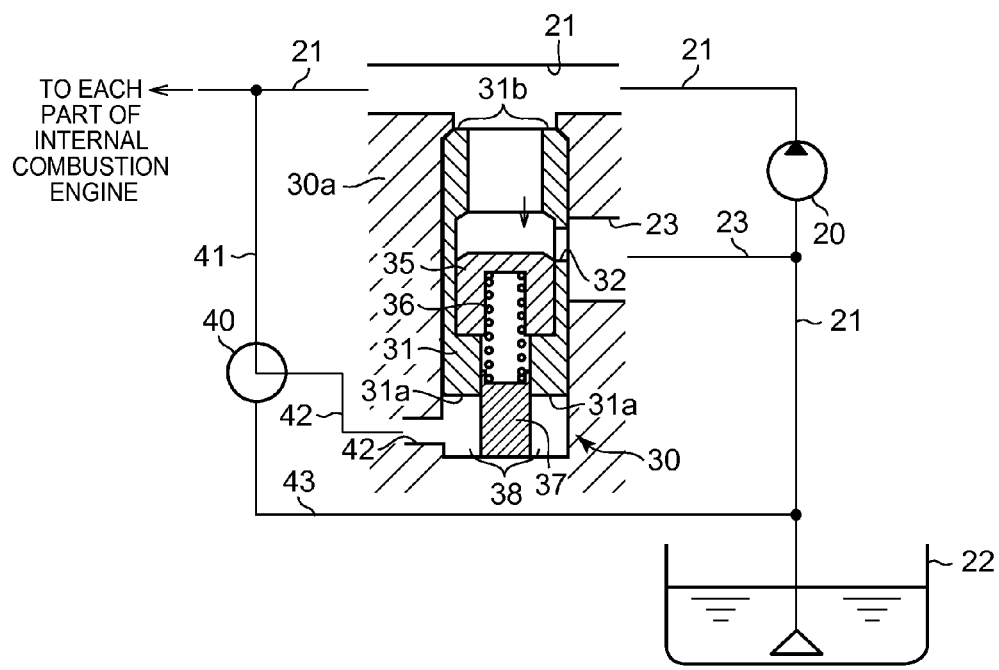
FIG. 3 is a schematic view to describe an operation form in a low relief pressure state of the hydraulic supply system in the embodiment.

The following describes a configuration and an operation of the pressure relief valve 30 of the hydraulic supply system in the present embodiment further in detail, with reference to FIGS. 2 and 3. Note that FIGS. 2 and 3 are schematic views each illustrating the configuration of the pressure relief valve 30 of the hydraulic supply system in the present embodiment. FIG. 2 illustrates a state where the pressure relief valve 30 is in a high relief pressure state, and FIG. 3 illustrates a state where the pressure relief valve 30 is in a low relief pressure state.

As described above, the pressure relief valve 30 is provided in that part of the supply passage 21 which is more on the downstream side than the pump 20. As illustrated in FIG. 2, the pressure relief valve 30 is configured such that a cylindrical sleeve 31 is accommodated in a housing 30a in an axially slidable manner. More specifically, the sleeve 31 is accommodated in a valve accommodation space 30b that is formed in the housing 30a so as to communicate with the supply passage 21 and the recirculation passage 23. Further, on a side wall of the sleeve 31, a relief port 32 is formed so as to penetrate through the side wall in a radial direction. The relief port 32 communicates with the recirculation passage 23. Further, inside the sleeve 31, a bottomed-cylindrical valve element 35 that is slidable in an axial direction of the sleeve 31, namely, in an up-and-down direction in FIG. 2, is accommodated in the sleeve 31 so as to open and close the relief port 32.

A support member 37 is fixed to a downward bottom face, in FIG. 2, of the housing 30a of the pressure relief valve 30. Further, a compressed spring 36 is accommodated between the support member 37 and the valve element 35. Hereby, the valve element 35 is always biased by the spring 36 upward in FIG. 2, namely, in a direction to close the relief port 32.

Accordingly, the pressure relief valve 30 is configured such that, when the pressure of the lubricant flowing through the supply passage 21 increases and that pressure of the lubricant which acts on the valve element 35 increases, the valve element 35 is displaced downward in FIG. 2 against a biasing force of the spring 36 as shown by an arrow, thereby resulting in that the relief port 32 is opened.

As illustrated on the right side of FIG. 2, the relief port 32 is formed to be opened within the recirculation passage 23. Accordingly, when the valve element 35 is displaced to a valve-opening position, namely, a position where the relief port 32 is opened, the supply passage 21 communicates with the recirculation passage 23 via the relief port 32.

When the supply passage 21 communicates with the recirculation passage 23 via the relief port 32 as such, part of the lubricant flowing through the supply passage 21 is recirculated via the recirculation passage 23 to the upstream side with respect to the pump 20.

In short, in the pressure relief valve 30, the relief pressure is determined by a magnitude of the biasing force of the spring 36. That is, when that biasing force of the lubricant flowing through the supply passage 21 which biases the valve element 35 downward in FIG. 2 becomes larger than the biasing force of the spring 36, the relief port 32 is opened, so that the part of the lubricant flowing through the supply passage 21 is recirculated to the upstream side with respect to the pump 20.

As illustrated on the lower side in FIG. 2, a back-pressure chamber 38 is formed between a bottom face 31a of the sleeve 31 and that bottom face of the housing 30a to which the support member 37 is fixed. Part of the lubricant flowing through the supply passage 21 is selectively introduced into the back-pressure chamber 38 sequentially via a branch passage 41 and a back-pressure passage 42.

As described above, the sleeve 31 is accommodated in the housing 30a of the relief valve 30 slidably in its axial direction. Hereby, the pressure relief valve 30 is configured such that the sleeve 31 is displaced in the up-and-down direction inside the housing 30a according to a magnitude relationship between a biasing force to bias the sleeve 31 upward in FIG. 2 due to an oil pressure acting on the bottom face 31a of the sleeve 31, and a force to bias the sleeve 31 downward due to an oil pressure acting on a top face 31b of the sleeve 31.

Note that a shape of the sleeve 31 is designed such that an area of the bottom face 31a on which an oil pressure in the back-pressure chamber 38 acts is larger than an area of the top face 31b on which the pressure of the lubricant flowing through the supply passage 21 acts. In view of this, when the back-pressure chamber 38 communicates with the supply passage 21 via the branch passage 41 and the back-pressure passage 42 so as to cause equivalent oil pressures to work on the bottom face 31a and the top face 31b of the sleeve 31, the force to bias the sleeve 31 upward becomes larger because a pressure receiving area of the bottom face 31a is larger than a pressure receiving area of the top face 31b.

As a result, the sleeve 31 is displaced upward so as to be placed on an upper side in the housing 30a as illustrated in FIG. 3. Even in a state of FIG. 3, the relief port 32 communicates with the recirculation passage 23.

As illustrated on the left side of FIG. 2, the oil-pressure switching valve 40 is provided between the branch passage 41 connected to the supply passage 21 and the back-pressure passage 42 connected to the back-pressure chamber 38. A drain passage 43 is further connected to the oil-pressure switching valve 40, so that the oil-pressure switching valve 40 is able to switch between a state where the branch passage 41 communicates with the back-pressure passage 42 as illustrated in FIG. 3 and a state where the back-pressure passage 42 communicates with the drain passage 43 as illustrated in FIG. 2.

The drain passage 43 is connected to that part of the supply passage 21 which is more on the upstream side than the pump 20. When the oil-pressure switching valve 40 is switched to the state where the back-pressure passage 42 communicates with the drain passage 43, the drain passage 43 recirculates the lubricant in the back-pressure chamber 38 to that part of the supply passage 21 which is more on the upstream side than the pump 20.

The hydraulic supply system of the present embodiment controls the oil pressure in the back-pressure chamber 38 by operating the oil-pressure switching valve 40, thereby consequently changing a position of the sleeve 31 in the housing 30a so as to change the relief pressure.

More specifically, as illustrated in FIG. 3, in a case where part of the lubricant in the supply passage 21 is introduced into the back-pressure chamber 38 by operating the oil-pressure switching valve 40 so that the branch passage 41 communicates with the back-pressure passage 42, an oil pressure equivalent to the pressure of the lubricant in the supply passage 21 acts on the bottom face 31a of the sleeve 31.

As a result, when a force to bias the sleeve 31 upward in FIG. 3 due to the oil pressure acting on the bottom face 31a of the sleeve 31 becomes larger than a force to bias the sleeve 31 downward in FIG. 3 due to the oil pressure acting on the top face 31b of the sleeve 31, the sleeve 31 is displaced upward so as to be placed on the upper side in the housing 30a of the pressure relief valve 30 as illustrated in FIG. 3.

In the meantime, in a case where the oil-pressure switching valve 40 is switched so that the back-pressure passage 42 communicates with the drain passage 43 as illustrated in FIG. 2, the lubricant in the back-pressure chamber 38 is recirculated via the drain passage 43 to that part of the supply passage 21 which is more on the upstream side than the pump 20. This results in that the oil pressure in the back-pressure chamber 38 decreases.

As a result, when the force to bias the sleeve 31 downward in FIG. 2 due to the oil pressure acting on the top face 31b of the sleeve 31 becomes larger than the force to bias the sleeve 31 upward in FIG. 2 due to the oil pressure acting on the down face 31a of the sleeve 31, the sleeve 31 is displaced downward so as to be placed on a lower side in the housing 30a of the relief valve 30 as illustrated in FIG. 2.

In a case where the sleeve 31 is placed on the lower side in the housing 30a as such, an amount of compression of the spring 36 at the time when the valve element 35 is displaced to the valve-opening position becomes larger than a case where the sleeve 31 is placed on the upper side as illustrated in FIG. 3. That is, when the sleeve 31 is placed on the lower side as illustrated in FIG. 2, the biasing force that the valve element 35 receives from the spring 36 becomes large in comparison with the case where the sleeve 31 is placed on the upper side as illustrated in FIG. 3. Accordingly, a pressure of the lubricant in the supply passage 21 at the time when the relief port 32 is opened, namely, the relief pressure increases.

In the meantime, in the case where the sleeve 31 is placed on the upper side in the housing 30a as illustrated in FIG. 3, the amount of compression of the spring 36 at the time when the valve element 35 is displaced to the valve-opening position becomes smaller than the case where the sleeve 31 is placed on the lower side. That is, in the case of FIG. 3, the biasing force that the valve element 35 receives from the spring 36 becomes small in comparison with the case where the sleeve 31 is placed on the lower side.

Thus, according to the hydraulic supply system of the present embodiment, when a hydraulic oil in the back-pressure chamber 38 is controlled by operating the oil-pressure switching valve 40 so that the sleeve 31 is consequently displaced in a stretch direction of the spring 36, it is possible to switch between the high relief pressure state (the state illustrated in FIG. 2) in which the relief pressure is high and the low relief pressure state (the state illustrated in FIG. 3) in which the relief pressure is low.

In the present embodiment, a magnitude of demand for the lubricant in the internal combustion engine 10 is estimated based on an engine rotation speed NE and an engine load KL. When the demand for the lubricant is not so large like a case where the engine rotation speed NE is low and the engine load KL is low, the oil-pressure switching valve 40 is operated to execute a low-pressure control to realize (switch to) the low relief pressure state. Further, when the demand for the lubricant is large like a case where the engine rotation speed NE is high and the engine load KL is high, the oil-pressure switching valve 40 is operated to execute a high-pressure control to realize (switch to) the high relief pressure state.

In the meantime, as described above, at the time of starting the internal combustion engine 10, such a situation occurs that the lubricant in the supply passage 21 flows out during its preceding engine stop and the lubricant is not left in the supply passage 21. In view of this, it is conceivable that at the time of starting the internal combustion engine 10, the execution of the low-pressure control is prohibited and the high-pressure control is executed, so that the pressure of the lubricant in the supply passage 21 is brought to a high state right after the engine starts, thereby allowing the lubricant to go around to ends of the supply passage 21 immediately.

However, if automatic stop and restart controls of the internal combustion engine 10 are executed, the restart of the internal combustion engine 10 is performed more frequently, so that the execution of the low-pressure control is prohibited frequently. This results in that execution chance of the low-pressure control is limited greatly.

In view of such a problem, in the present embodiment, the execution of the low-pressure control is prohibited at the time of starting the internal combustion engine 10 along with an operation of the ignition switch 108, but the prohibition of the execution of the low-pressure control is canceled at the time of restarting the internal combustion engine 10. Hereby, while occurrence of insufficiency of supplies of the lubricant in engine starting is restrained, fuel consumption of the internal combustion engine 10 is restrained by reducing that driving load of the pump 20 which acts on the internal combustion engine 10, as much as possible.

Next will be described an effect of the present embodiment with reference to FIGS. 4 and 5.

Figure 4:
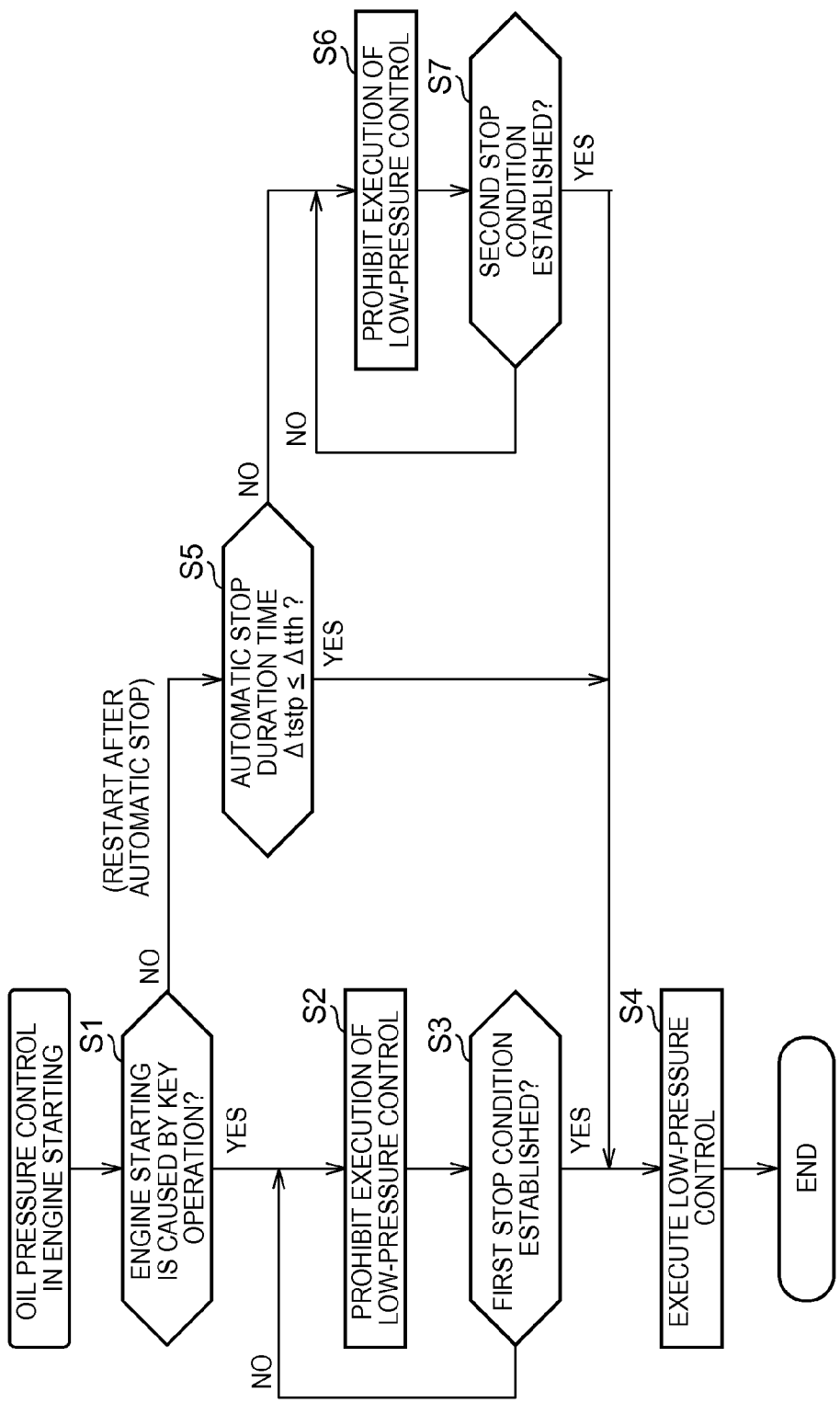
FIG. 4 is a flow chart illustrating a procedure of an oil pressure control in engine starting in the embodiment.

FIG. 4 is a flow chart illustrating a procedure of an oil pressure control in engine starting in the present embodiment. The oil pressure control is executed at the time when the starting of the internal combustion engine 10 is initiated by the electronic control device 100.

As illustrated in FIG. 4, in this series of process, initially in step S1, it is determined whether or not the starting of the internal combustion engine 10 is executed by a key operation. That is, it is determined whether the starting is engine starting due to the operation of the ignition switch 108, or engine starting executed due to the aforementioned establishment of the predetermined restart condition. Here, in a case of the engine starting due to the key operation (step S1: "YES"), the process advances to step S2 to prohibit the execution of the low-pressure control. When the execution of the low-pressure control is prohibited and the high-pressure control is executed as such, the process advances to step S3 to determine whether or not a first stop condition is established. Here, the first stop condition is intended to stop the high-pressure control, and is established when a first determination time $\Delta t1$ has passed from the initiation of the engine starting, for example. Note that the first determination time $\Delta t1$ is a maximum value of time required for the lubricant to go around to the ends of the supply passage 21 at the time when the execution of the low-pressure control is prohibited along with the starting of the internal combustion engine 10 from such a situation in which the lubricant in the supply passage 21 flows out during the engine stop and almost none of the lubricant is left in the supply passage 21. The first determination time $\Delta t1$ is a value set in advance through experiment or the like.

When the first stop condition is not established in step S3 (step S3: "NO"), the determination process of step S3 is executed repeatedly every predetermined period until the condition is established. Meanwhile, when the first stop condition is established in step S3 (step S3: "YES"), the process advances to step S4 to execute the low-pressure control, and the series of process is finished.

Further, when the starting of the internal combustion engine 10 is not executed by the key operation (step S1: "NO"), that is, when the starting is a restart after the automatic stop, the process advances to step S5 to determine whether or not preceding automatic stop duration time $\Delta tstp$ is a predetermined time $\Delta tth$ or less. The predetermined time $\Delta tth$ is a determination value that is set to be variable depending on the cooling water temperature ThW during preceding automatic stop, and more specifically, it is set with reference to a map so as to become shorter as the cooling water temperature ThW is higher. The reason why the predetermined time $\Delta tth$ is set to be variable depending on the cooling water temperature ThW as such will be described later.

When the preceding automatic stop duration time $\Delta tstp$ is the predetermined time $\Delta tth$ or less in step S5 (step S5: "YES"), the process advances to step S4 to execute the low-pressure control, and the series of process is finished. The reason is as follows: the engine starting is executed before the lubricant in the supply passage 21 flows out during the preceding engine stop, so that it is determined that the pressure of the lubricant in the supply passage 21 is maintained to be high to some extent while the circulation amount of the lubricant is limited.

Meanwhile, when the preceding automatic stop duration time $\Delta tstp$ is longer than the predetermined time $\Delta tth$ in step S5 (step S5: "NO"), the process advances to step S6 to prohibit the execution of the low-pressure control. When the execution of the low-pressure control is prohibited and the high-pressure control is executed as such, the process advances to step S7 to determine whether or not a second stop condition is established. Here, the second stop condition is intended to stop the high-pressure control, and is established when a second determination time $\Delta t2$ has passed from the initiation of the engine starting, for example. The second determination time $\Delta t2$ is set to a value smaller than the first determination time $\Delta t1$. The reason is as follows: although the automatic stop duration time $\Delta tstp$ is longer than the predetermined time $\Delta tth$, a lot of lubricant still remains in the supply passage 21 at the time of restarting the internal combustion engine 10 in comparison with the first starting due to the key operation, so that time required for the lubricant to go around to the ends of the supply passage 21 does not need to be long. Note that the second determination time $\Delta t2$ is a maximum value of time required for the lubricant to go around to the ends of the supply passage 21 at the time when the high-pressure control is executed along with the restart of the internal combustion engine 10 from such a situation in which the automatic stop of the internal combustion engine 10 is executed for a long period of time and almost none of the lubricant is left in the supply passage 21. The second determination time $\Delta t2$ is a value set in advance through experiment or the like.

When the second stop condition is not established in step S7, the determination process of step S7 is executed repeatedly every predetermined period until the condition is established. Meanwhile, when the second stop condition is established in step S7, the process advances to step S4 to execute the low-pressure control, and the series of process is finished.

Here, the following describes the reason why the predetermined time $\Delta tth$ is set to be variable depending on the cooling water temperature ThW, in terms of the process in step S5.

In order to reduce that driving load of the pump 20 which acts on the internal combustion engine 10 by increasing the execution chance of the low-pressure control, it is desirable to set the predetermined time $\Delta tth$ as long as possible. However, even if the preceding automatic stop duration time $\Delta tstp$ is the same, an amount of the lubricant flowing out of the supply passage 21 during the engine stop increases as a viscosity of the lubricant is lower. In view of this, if the predetermined time $\Delta tth$ is set to a fixed value that is as long as possible on the presumption that the viscosity is high and the lubricant in the supply passage 21 is hard to flow out, the following problems might occur. That is, even in a case where the preceding automatic stop duration time $\Delta tstp$ is less than the predetermined time $\Delta tth$, if the viscosity is low and the lubricant in the supply passage 21 is easy to flow out, such a situation might occur that the lubricant in the supply passage 21 flows out during the engine stop and the lubricant is not left in the supply passage 21. In view of this, at the time of restarting the internal combustion engine 10, the predetermined time $\Delta tth$ is set to become shorter as the cooling water temperature ThW during the preceding automatic stop is higher, so that the predetermined time $\Delta tth$ is set precisely according to the cooling water temperature ThW that has a high correlation with the viscosity of the lubricant.

Figure 5:
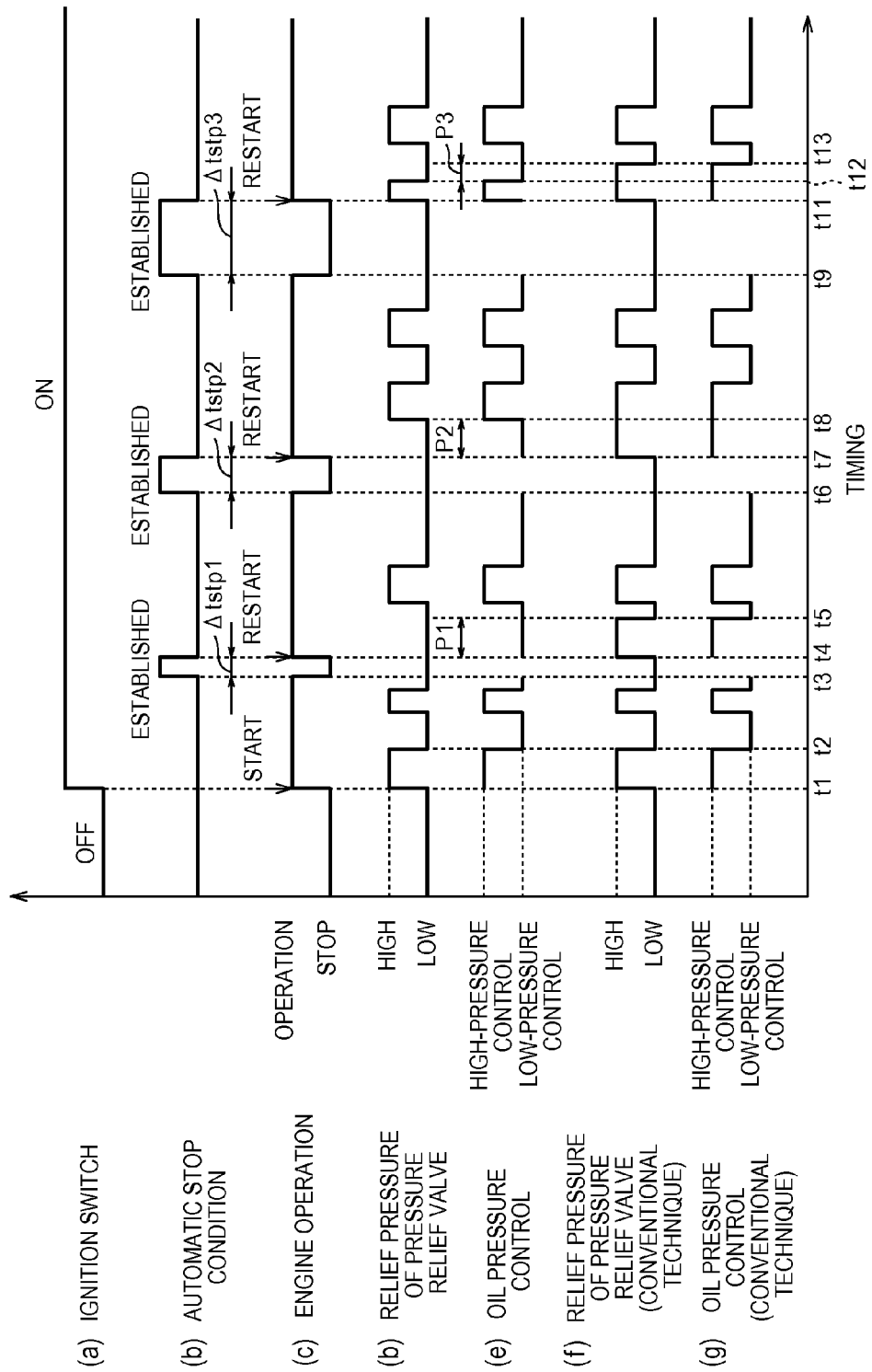
FIG. 5 (a) to (e) are timing charts illustrating exemplary transitions of various parameters when the oil pressure control is executed in engine starting in the embodiment, and (f), (g) are timing charts illustrating exemplary transitions of various parameters when a conventional oil pressure control is executed in engine starting.

FIG. 5 is timing charts illustrating exemplary transitions of various parameters when the oil pressure control is executed in the engine starting.

As illustrated in FIG. 5, in the oil pressure control in the present embodiment, when an ON operation is executed on the ignition switch 108 at timing t1 (a) and the engine starting is initiated (c), the relief pressure of the pressure relief valve 30 is set to a high relief pressure (d), so that the execution of the low-pressure control is prohibited and the high-pressure control is executed (e). Note that the high-pressure control is continued from the timing t1 to timing t2 at which the first determination time $\Delta t1$ passes.

At the time of starting the internal combustion engine 10 along with the operation of the ignition switch 108, an elapsed time until the starting after the engine operation is stopped just before that is often long. In this case, such a situation occurs that the lubricant in the supply passage 21 flows out during the engine stop and the lubricant is not left in the supply passage 21 at the time of the engine starting. Here, according to the present embodiment, at the time of starting the internal combustion engine 10 along with the operation of the ignition switch 108, the execution of the low-pressure control is prohibited and the high-pressure control is executed, so that the circulation amount is not limited right after the engine starting, and the lubricant is circulated. Hereby, the pressure of the lubricant in the supply passage 21 is maintained to be high right after the engine starting, in comparison with the case where the low-pressure control is executed. This consequently allows the lubricant to go around to the ends of the supply passage 21 immediately.

When a predetermined automatic stop condition is established at subsequent timing t3 (b), the engine operation is stopped along with this (c). Then, when the predetermined restart condition is established at timing t4 (b), the internal combustion engine 10 is restarted (c). Here, since a preceding automatic stop duration time $\Delta tstp1$ is the predetermined time $\Delta tth$ or less, the relief pressure of the pressure relief valve 30 is set to a low relief pressure after the timing t4 (d), so that the low-pressure control is executed (e).

When the predetermined automatic stop condition is established at subsequent timing t6 (b), the engine operation is stopped along with this (c). Then, when the predetermined restart condition is established at timing t7 (b), the internal combustion engine 10 is restarted (c). Even here, since a preceding automatic stop duration time $\Delta tstp2$ is the predetermined time $\Delta tth$ or less, the relief pressure of the pressure relief valve 30 is set to the low relief pressure after the timing t7 (d), so that the low-pressure control is executed (e).

Thus, according to the present embodiment, at the time of the restart of the internal combustion engine 10 after the automatic stop, the low-pressure control is executed, so that the circulation amount of the lubricant is limited right after the engine starting. Here, in the restart of the internal combustion engine 10, an elapsed time after the engine operation is stopped just before that is often short. In this case, the engine starting is executed before the lubricant in the supply passage 21 flows out during the engine stop. In view of this, the pressure of the lubricant in the supply passage 21 is maintained to be high right after the engine starting, while the circulation amount of the lubricant is limited.

When the predetermined automatic stop condition is established at subsequent timing t9 (b), the engine operation is stopped along with this (c). Then, when the predetermined restart condition is established at timing t11 (b), the internal combustion engine 10 is restarted (c). Here, since a preceding automatic stop duration time $\Delta tstp3$ is longer than the predetermined time $\Delta tth$, the relief pressure of the pressure relief valve 30 is set to the high relief pressure after the timing t11 (d), so that the execution of the low-pressure control is prohibited and the high-pressure control is executed (e). Note that the high-pressure control is continued from the timing t11 to timing t12 at which the second determination time $\Delta t2$ ($<t1$) passes.

Meanwhile, in a case where the preceding automatic stop duration time $\Delta tstp$ is long, such a situation occurs that the lubricant in the supply passage 21 flows out during the engine stop and almost none of the lubricant is left in the supply passage 21 in the engine starting. If the low-pressure control is executed in response to the restart of the internal combustion engine 10 even in such a case, it takes much time until the lubricant goes around to the ends of the supply passage 21 just after the engine starting. In this regard, in the present embodiment, even in the restart of the internal combustion engine 10, when the preceding automatic stop duration time $\Delta tstp$ is the predetermined time $\Delta tth$ or more, the cancellation of the prohibition of the execution of the low-pressure control is invalidated, and the execution of the low-pressure control is prohibited. Hereby, the high-pressure control is executed, so that occurrence of the aforementioned problems is restrained appropriately.

Even in a conventional oil pressure control, similarly to the oil pressure control in the present embodiment, in a period from the timing t1 at which the internal combustion engine 10 starts along with the operation of the ignition switch 108, to the timing t2, the relief pressure of the pressure relief valve 30 is set to the high relief pressure (f), so that the execution of the low-pressure control is prohibited and the high-pressure control is executed (g).

However, in the conventional oil pressure control, in a period P1 from the timing t4 to the timing t5 and in a period P2 from the timing t7 to the timing t8, which periods are for the restart after the automatic stop, the execution of the low-pressure control is prohibited and the high-pressure control is executed. Further, the high-pressure control is executed from the timing t11 to the timing t12 in the present embodiment, whereas the high-pressure control is executed from the timing t11 to timing t13 at which the first determination time $\Delta t1$ passes in the conventional oil pressure control. Because of this, in the conventional oil pressure control, the high-pressure control is executed in a period P3 from the timing t12 to the timing t13. From the above description, according to the present embodiment, an execution period of the low-pressure control increases as much as the periods P1, P2, P3.

According to the internal combustion engine control device of the present embodiment as described above, it is possible to obtain the following effects.

(1) The electronic control device 100 is configured such that: when the predetermined automatic stop condition is established, the engine operation is stopped automatically; and when the predetermined restart condition is established during the automatic stop, the internal combustion engine 10 is restarted. Further, the electronic control device 100 is configured such that: the execution of the low-pressure control is prohibited at the time of starting the internal combustion engine 10 along with the operation of the ignition switch 108; and the prohibition of the execution of the low-pressure control is canceled at the time of restarting the internal combustion engine 10. According to such a configuration, it is possible to restrain occurrence of insufficiency of supplies of the lubricant in the engine starting is restrained, and to restrain fuel consumption of the internal combustion engine 10 by reducing that driving load of the pump 20 which acts on the internal combustion engine 10, as much as possible.

(2) The electronic control device 100 is configured such that, when the preceding automatic stop duration time Δtstp is the predetermined time Δtth or more in the restart of the internal combustion engine 10, the cancellation of the prohibition of the execution of the low-pressure control is invalidated, and the execution of the low-pressure control is prohibited. According to such a configuration, it is possible to appropriately restrain occurrence of such a problem that, due to a long preceding automatic stop duration time Δtstp, the lubricant cannot go around to the ends of the supply passage 21 immediately just after the engine starting.

(3) The electronic control device 100 is configured such that, at the time of restarting the internal combustion engine 10, the predetermined time Δtth is set to become shorter as the cooling water temperature ThW during the preceding automatic stop is higher. According to such a configuration, by setting the predetermined time Δtth precisely according to the cooling water temperature ThW that has a high correlation with the viscosity of the lubricant, occurrence of insufficiency of supplies of the lubricant in the engine starting is restrained precisely. At the same time, it is possible to precisely restrain fuel consumption of the internal combustion engine 10 by reducing that driving load of the pump 20 which acts on the internal combustion engine 10, as much as possible.

Note that the internal combustion engine control device according to the present invention is not limited to the configuration as exemplified in the above embodiment, and can be implemented by the following form obtained by modifying this appropriately, for example.

In the above embodiment, the first determination time Δt1 and the second determination time Δt2 are values set in advance through experiment or the like. Instead of this, the first determination time Δt1 and the second, determination time Δt2 may be set to be variable depending on an engine temperature (e.g., the cooling water temperature ThW) at the time of the engine starting. That is, the viscosity of the lubricant is lower as the engine temperature in the engine starting is higher, and it takes less time for the lubricant to go around to the ends of the supply passage 21. Accordingly, by setting each determination time to be variable depending on the engine temperature, it is possible to set the execution period of the high-pressure control precisely.

The above embodiment exemplifies a case where the supply passage 21 of the lubricant is provided with the pressure relief valve 30 that is able to change the relief pressure, and in the low-pressure control, the relief pressure of the pressure relief valve 30 is decreased, so as to limit the circulation amount of the lubricant. However, the configuration to execute the low-pressure control is not limited to this. For example, such a configuration may be employed that a main pump and a sub-pump for engine driving are provided, and when demand for lubricant is small, driving of either one of the main pump and the sub-pump is stopped so as to limit a circulation amount of the lubricant.

In the above embodiment, the predetermined time Δtth for use in the determination on the automatic stop duration time Δtstp is set to be variable depending on the cooling water temperature ThW, but instead of this, a temperature of the lubricant may be detected directly, so that the predetermined time Δtth may be set to be variable depending on the temperature of the lubricant.

As described in the above embodiment, it is preferable to set the predetermined time Δtth to be variable depending on the engine temperature, in order to set the predetermined time Δtth precisely according to the engine temperature that has a high correlation with the viscosity of the lubricant. However, the present invention is not limited to the configuration in which the predetermined time Δtth is set to be variable depending on the engine temperature, and the predetermined time Δtth can be set to a fixed value.

As described in the above embodiment, it is preferable that the execution of the low-pressure control be prohibited when the preceding automatic stop duration time is the predetermined time or more in the restart of the internal combustion engine, in order to appropriately restrain occurrence of such a problem that, due to a long preceding automatic stop duration time, the lubricant cannot go around to the ends of the supply passage immediately just after the engine starting. However, the present invention is not limited to such an embodiment, and the low-pressure control may be always executed at the time of the restart of the internal combustion engine.

The above embodiment exemplifies such a configuration that, while the execution of the low-pressure control is prohibited at the time of starting the internal combustion engine 10 along with the operation of the ignition switch 108, the prohibition of the execution of the low-pressure control is canceled at the time of restarting the internal combustion engine 10. However, the present invention is not limited to the configuration in which the prohibition of the execution of the low-pressure control is canceled at the time of restarting the internal combustion engine as such. For example, such a configuration may be adoptable that, at the time of restarting the internal combustion engine, the limitation on the execution of the low-pressure control is relaxed, e.g., a prohibition period of the execution of the low-pressure control is shortened as compared with the time of the starting of the internal combustion engine along with the operation of the ignition switch. Even in this case, it is possible to restrain occurrence of insufficiency of supplies of the lubricant in the engine starting, and further to reduce that driving load of the pump which acts on the internal combustion engine.

DESCRIPTION OF REFERENCE NUMERALS

10 . . . internal combustion engine, 11 . . . output shaft, 20 . . . pump, 21 . . . supply passage, 22 . . . oil pan, 23 . . . recirculation passage, 30 . . . pressure relief valve, 30a . . . housing, 30b . . . valve accommodation space, 31 . . . sleeve, 31a . . . bottom face, 31b . . . top face, 32 . . . relief port, 35 . . . valve body, 36 . . . spring, 37 . . . support member, 38 . . . back-pressure chamber, 40 . . . oil-pressure switching valve, 41 . . . branch passage, 42 . . . back-pressure passage, 43 . . . drain passage, 10 . . . electronic control device, 101 . . . crank angle sensor, 102 . . . water temperature sensor, 103 . . . vehicle speed sensor, 104 . . . air flow meter, 105 . . . accelerator position sensor, 106 . . . brake sensor, 107 . . . shift position sensor, 108 . . . ignition switch.

The invention claimed is:

1. An internal combustion engine control device for an internal combustion engine that includes an engine driving pump, the control device comprising:
   an electronic control device configured to:
   (a) circulate lubricant by use of a driving force of the internal combustion engine, and reduce that driving load of the pump which acts on the internal combustion engine, by executing a low-pressure control to limit a circulation amount of the lubricant when demand for the lubricant is small;

(b) limit the execution of the low-pressure control in engine starting;
(c) stop an engine operation automatically when a predetermined automatic stop condition is established, and restart the internal combustion engine when a predetermined restart condition is established during the automatic stop; and
(d) relax the limitation on the execution of the low-pressure control, at the time of restarting the internal combustion engine, and invalidate the relaxation of the limitation on the execution of the low-pressure control and limit the execution of the low-pressure control, when a preceding automatic stop duration time is a predetermined time or more.

2. The internal combustion engine control device according to claim 1, wherein:
in the restart of the internal combustion engine, the electronic control device is configured to set the predetermined time to become shorter as an engine temperature during the preceding automatic stop is higher.

3. The internal combustion engine control device for the internal combustion engine wherein the internal combustion engine further includes a supply passage of the lubricant, the supply passage is provided with a pressure relief valve that is able to change a relief pressure, the internal combustion engine control device according to claim 1, wherein:
in the low-pressure control, the relief pressure of the pressure relief valve is decreased so as to limit the circulation amount of the lubricant.

\* \* \* \* \*